United States Patent
Fradkin et al.

(10) Patent No.: US 12,174,723 B2
(45) Date of Patent: Dec. 24, 2024

(54) APPROACH FOR ANALYSIS OF LOGS FROM A COMPLEX PHYSICAL EQUIPMENT

(71) Applicant: Siemens Healthcare Diagnostics Inc., Tarrytown, NY (US)

(72) Inventors: Dmitriy Fradkin, Wayne, PA (US); Tugba Kulahcioglu, Plainsboro, NJ (US); Oladimeji Farri, Upper Saddle River, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 17/905,625

(22) PCT Filed: Mar. 3, 2021

(86) PCT No.: PCT/US2021/020750
§ 371 (c)(1),
(2) Date: Sep. 2, 2022

(87) PCT Pub. No.: WO2021/178594
PCT Pub. Date: Sep. 10, 2021

(65) Prior Publication Data
US 2023/0124408 A1    Apr. 20, 2023

Related U.S. Application Data

(60) Provisional application No. 62/985,615, filed on Mar. 5, 2020.

(51) Int. Cl.
*G06F 11/34*    (2006.01)
*G06F 3/0482*    (2013.01)
(Continued)

(52) U.S. Cl.
CPC ........ *G06F 11/3476* (2013.01); *G06F 3/0482* (2013.01); *G06F 3/0484* (2013.01);
(Continued)

(58) Field of Classification Search
CPC .. G06F 11/3476; G06F 3/0482; G06F 3/0484; G06F 11/3013; G06F 16/148; G06F 16/156; G06F 16/16
See application file for complete search history.

(56) References Cited

U.S. PATENT DOCUMENTS

| | | | |
|---|---|---|---|
| 7,822,850 B1 | 10/2010 | Brikman et al. | |
| 2011/0185234 A1 | 7/2011 | Cohen et al. | |

(Continued)

FOREIGN PATENT DOCUMENTS

| | | |
|---|---|---|
| JP | 2014-035749 A | 2/2014 |
| JP | 2017-068748 A | 4/2017 |

(Continued)

OTHER PUBLICATIONS

PCT International Search Report and Written Opinion dated Jun. 30, 2021 (12 Pages).

(Continued)

*Primary Examiner* — Richard L Bowen
*Assistant Examiner* — Aryan D Toughiry (57) ABSTRACT

A computer-implemented method for analyzing log files generated by complex physical equipment includes receiving one or more log file generated by one or more components of physical equipment. Each of the log files comprises one or more log entries. A plurality of templates are extracted from each log file describing fixed portions of the log entries. The log entries are grouped in log files into a plurality of instances. Each instance corresponds to one of a plurality of partitions along one or more dimensions describing data in the log entries. A representation of each instance (Continued)

is created that describes a set of the templates included in the instance. A plurality of clusters are generated by applying a clustering process to the representations of the instances. A visual depiction of the clusters and the instances may then be created in a graphical user interface (GUI).

20 Claims, 6 Drawing Sheets

(51) Int. Cl.
*G06F 3/0484* (2022.01)
*G06F 11/30* (2006.01)
*G06F 16/14* (2019.01)
*G06F 16/16* (2019.01)

(52) U.S. Cl.
CPC ........ *G06F 11/3013* (2013.01); *G06F 16/148* (2019.01); *G06F 16/156* (2019.01); *G06F 16/16* (2019.01)

(56) References Cited

U.S. PATENT DOCUMENTS

| | | | |
|---|---|---|---|
| 2012/0173466 A1 | 7/2012 | Fernandess et al. | |
| 2017/0169078 A1 | 6/2017 | Fradkin et al. | |
| 2017/0169080 A1 | 6/2017 | Parthasarathy et al. | |
| 2018/0075038 A1* | 3/2018 | Azvine | G06F 16/22 |
| 2018/0102938 A1* | 4/2018 | Yoon | G06F 16/358 |
| 2019/0325056 A1* | 10/2019 | Sloane | G06F 16/248 |
| 2020/0118652 A1* | 4/2020 | Irish | G16H 10/40 |
| 2021/0243210 A1* | 8/2021 | Bernardi | G06F 21/552 |

FOREIGN PATENT DOCUMENTS

| | | |
|---|---|---|
| JP | 2017-167880 A | 9/2017 |
| JP | 2018-530803 A | 10/2018 |
| JP | 2019-053763 A | 4/2019 |
| JP | 2019-523409 A | 8/2019 |
| WO | 2011/111599 A1 | 9/2011 |

OTHER PUBLICATIONS

Makanju et al; "Clustering Event Logs Using Iterative Partitioning"; Jul. 1, 2009; pp. 1255-1263; [retrieved on Apr. 29, 2021]. Retrieved from the Internet: <URL:https://dl.acm.org/doi/pdf/10.1145/1557019.1557154>.
Eriksson; "Clustering Generic Log Files Under Limited Data Assumptions"; pp. 1-40; Aug. 18, 2016 [retrieved on Apr. 29, 2021). Retrieved from the Internet: <URL:https://www.diva-portal.org/smash/get/diva2:948252/FULLTEXT01.pdf>.
He, Pinjia, Jieming Zhu, Zibin Zheng, and Michael R. Lyu. "Drain: An online log parsing approach with fixed depth tree." In 2017 IEEE International Conference on Web Services (ICWS), pp. 33-40. IEEE, 2017.
Jieming Zhu, Shilin He, Jinyang Liu, Pinjia He, Qi Xie, Zibin Zheng, Michael R. Lyu. Tools and Benchmarks for Automated Log Parsing. International Conference on Software Engineering (ICSE), 2019.
Extended EP Search Report dated Jul. 7, 2023 of corresponding European Application No. 21764104.2, 4 Pages.
Eriksson Hakan et al: Clustering Generic Log Files Under Limited Data Assumptions, Master's Thesis at CSC, Jan. 1, 2016 (Jan. 1, 2016), pp. 1-49, XP055855818, Retrieved from the Internet: URL:https://www.diva-portal.org/smash/get/div a2:948252/ FULLTEXT01.pdf.

* cited by examiner

APPROACH FOR ANALYSIS OF LOGS FROM A COMPLEX PHYSICAL EQUIPMENT

CROSS REFERENCE TO RELATED APPLICATION

This application claims the benefit of U.S. Provisional Patent Application No. 62/985,615, entitled "AN APPROACH FOR ANALYSIS OF LOGS FROM A COMPLEX PHYSICAL EQUIPMENT" filed Mar. 5, 2020, the disclosure of which is hereby incorporated by reference in its entirety for all purposes.

TECHNICAL FIELD

The present invention relates generally to systems, methods, and apparatuses related to the analysis of log files generated by complex physical equipment. The techniques described herein may be applied to, for example, the analysis of log entries generated by immunoassay and chemistry analyzers.

BACKGROUND

Development of technology in many domains, including manufacturing and healthcare, continues at rapid pace. Increasingly, systems operating in these domains use sophisticated machines supporting multiple configurations and capable of performing a variety of tasks with minimal human involvement. For example, systems for performing immunoassay and clinical chemistry analyses typically have multiple, diverse computing devices, each performing tasks in an autonomous or nearly autonomous manner.

During operation of a complex system, its constituent components generate data in the form of textual or binary files referred to herein as "log data" or simply "logs." These logs are generated by print statements within the software executed by the equipment. The data in the logs include information that is useful in understanding how the equipment is operating. For example, a log may contain an indication of when certain messages were received or generated, sensor measurements, a sequence of commands received and operations performed, the values of variables at a given time point, or a stack trace describing the contents of system memory when an error occurs.

While a complex system is capable of quickly performing complicated tasks, the system's complexity makes it challenging to troubleshoot any issues. Traditionally, a customer first detects a problem involving the system and reports that problem to the company or organization tasked with maintaining the system. Then, a domain expert (such as a support engineer) must manually review the data. Depending on various factors, the time between the initial symptoms of the problem and its resolution can be lengthy. The speed of resolution would depend on the experience of the support engineer and the complexity of the problem. This troubleshooting process is slow and labor-intensive.

SUMMARY

Embodiments of the present invention address and overcome one or more of the above shortcomings and drawbacks, by providing methods, systems, and apparatuses related to the automated analysis of log data from complex physical equipment in order to optimize operations and detect and diagnose problems. This analysis could support a domain expert in rapidly identifying problems with the equipment, or it may be used for automatic or semiautomatic troubleshooting and remediation procedures.

According to some embodiments, a computer-implemented method for analyzing log files generated by complex physical equipment includes receiving one or more log files generated by one or more components of physical equipment. Each of the log files comprises one or more log entries. A plurality of templates are extracted from each log file describing fixed portions of the log entries. The log entries are grouped in log files into a plurality of instances. Each instance corresponds to one of a plurality of partitions along one or more dimensions describing data in the log entries. A representation of each instance is created that describes a set of the templates included in the instance. A plurality of clusters are generated by applying a clustering process to the representations of the instances. A visual depiction of the clusters and the instances may then be created in a graphical user interface (GUI).

In other embodiments, an article of manufacture for analyzing log files generated by complex physical equipment comprise a non-transitory, tangible computer-readable medium holding computer-executable instructions for performing the method described above.

According to other embodiments, a system for analyzing log files generated by complex physical equipment includes a non-transitory, tangible computer-readable medium, one or more processors, and a display. The computer-readable medium holds one or more log files generated by one or more components of physical equipment. Each log file comprises one or more log entries. The processors are configured to extract a plurality of templates from each log file describing fixed portions of the log entries and group the log entries in log files into a plurality of instances. Each instance corresponds to one of a plurality of dimensions describing data in the log entries. The processors are further configured to create a representation of each instance describing a set of the templates included in the instance, and generate a plurality of clusters by applying a clustering process to the representations of the instances. The display presents a visual depiction of the clusters and the instances in a GUI.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

The present invention relates generally to methods, systems, and apparatuses related to automated analysis of log data from complex physical equipment in order to optimize operations and detect and diagnose problems.

Figure 1:
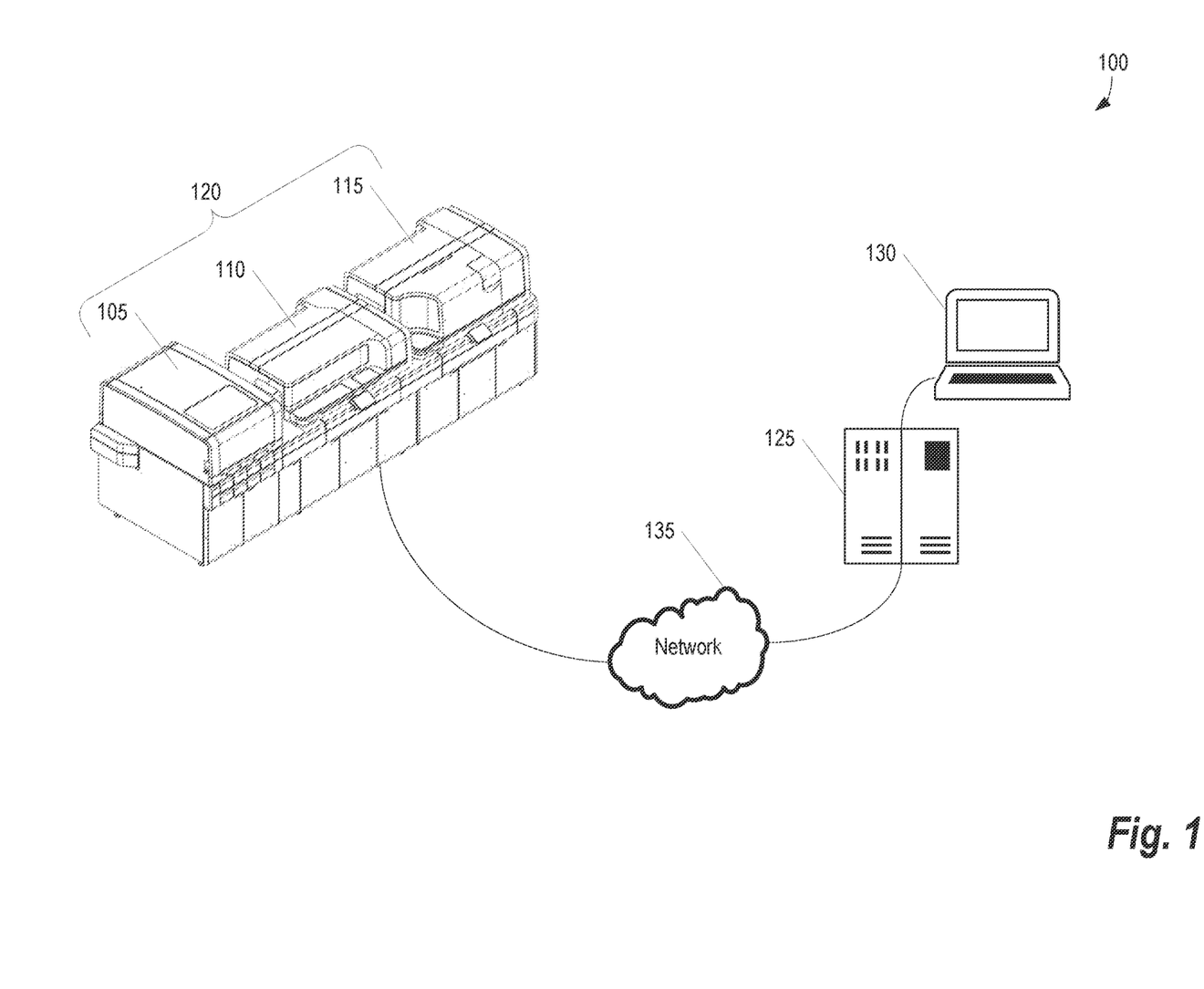
FIG. 1 illustrates a system for the automated analysis of log data, according to some embodiments.

FIG. 1 illustrates a system 100 for the automated analysis of log data, according to some embodiments. In this example, a group of Components 105, 110, and 115 operate jointly as an Immunoassay and Clinical Chemistry Analyzer System 120. As is generally understood in the art, a Immunoassay and Clinical Chemistry Analyzer System 120 comprises multiple computing devices that operate in series to perform tests on biological samples. It should be understood that the Immunoassay and Clinical Chemistry Analyzer System 120 is one example of complex physical equipment where the log analysis techniques described herein could be applied. In general, these techniques can be applied to any type of complex physical equipment where log analysis data is generated.

The Immunoassay and Clinical Chemistry Analyzer System 120 transfers log files to a Log Processing Computer 125 over a Network 135. This Network 135 may be, for example, a local area network or the Internet. Although lines are used in FIG. 1 connecting the various devices to the Network 135, it should be understood that the Network 135 may operate in a wired or wireless manner. Any technique generally known in the art may be used to facilitate the transfer of data over the Network 135. Data transfers may occur, for example, at scheduled intervals (e.g., hourly, nightly, etc.), in real-time (i.e., as log files are generated), or on request from a user.

The Log Processing Computer 125 stores log files generated by the Components 105, 110, and 115. It should be noted that, although a centralized log storage is shown in FIG. 1, in other embodiments, different storage architectures may be employed. For example, in one embodiment, each Component 105, 110, and 115 stores its log files locally within its respective unit. In other embodiments, the Immunoassay and Clinical Chemistry Analyzer System 120 includes a local storage mechanism that stores the log files generated by each of the Components 105, 110, and 115. The Log Processing Computer 125 analyzes each log file using the technique described below with reference to FIGS. 2 and 3. Based on this analysis, one or more graphical user interfaces (GUIs) are generated to display the results of the analysis. These GUIs may then be displayed on a User Computer 130 either directly connected to the Log Processing Computer 125 (as in FIG. 1) or indirectly connected to the Log Processing Computer 125 over the Network 135.

Each log file comprises one or more log entries. The techniques described herein assume that each log entry has contents (i.e., the message) and a timestamp. The message is typically generated automatically by the Component 105, 110 or 115 and comprises a fixed part (template) and parameters as would happen in a print statement from a program. One example of an entry is the following: "Number of Tips Available: 17 NumberofTipsComitted: 0", where "17" and "0" are parameters, and the rest are a template.

If one had full access to the source code of the Immunoassay and Clinical Chemistry Analyzer System 120, one would be able to identify output statements and their formats, and thus know exactly which part of the log entry is the template and which are the parameters. The message above is likely produced by code similar to: print("Number of Tips Available: { } NumberofTipsComitted: { }".format (17,0)). However, having access to source code is rarely possible, so there is a need to organize the logs and extract templates and parameters automatically.

Given some domain knowledge of the Immunoassay and Clinical Chemistry Analyzer System 120, the logs can be automatically parsed to identify messages and parameters marking the starts and ends of instances. For example, domain knowledge may specify that a message "Starting cycle 364" marks start of a cycle, or that message "OnEventSampleArrived( ) SampleUID: 13514" marks start of a job with id 13514. This is sufficient to select messages belonging to a specific instance (described below). Furthermore, template extraction methods generally known in the art may be used to match each message to a template and identify its parameters. Example template extraction methods are described in He, Pinjia, Jieming Zhu, Zibin Zheng, and Michael R. Lyu. "Drain: An online log parsing approach with fixed depth tree." In 2017 *IEEE International Conference on Web Services (ICWS)*, pp. 33-40. IEEE, 2017 and Jieming Zhu, Shilin He, Jinyang Liu, Pinjia He, Qi Xie, Zibin Zheng, Michael R. Lyu. Tools and Benchmarks for Automated Log Parsing. International Conference on Software Engineering (ICSE), 2019

The log files can be organized along several dimensions including a temporal dimension, a spatial dimension, and a job- or task-based dimension. Each dimension allows grouping of log entries into a single data point for analysis, referred to herein as an "instance." Considering the various instances associated with a log file allows extraction of the most useful information provided in the data entries. It should be understood that instances are not independent of each other. For example, in some embodiments, analysis can consider dependencies between different cycles, locations or jobs.

The temporal dimension of the log files describes when data was generated or what time(s) are otherwise relevant for a particular content item. For example, logs can be organized into cycles, which are scheduling units of activity. A system first schedules, and then attempts to execute, a certain number of operations in a specific cycle. A value of cycle identifier (id) can be found in at least some messages and starts/ends/status of cycles can be extracted. Thus, it is possible to treat the sequence of logs corresponding to a single cycle as a single instance for analysis. The spatial dimension describes where the data is generated or what component(s) or functionality the data refers to. The system can perform multiple distinct operations/functionalities that can be thought of roughly as different locations within the system. It is therefore possible to consider each of these "locations" as a separate instance. Finally, the job or task dimension describes what functionality the log entry refers to. A system is given a specific job, comprising one or more tasks. The number of individual tasks that a machine can perform is limited, but the jobs may comprise different combinations of tasks with different inputs. It should also be noted that distinct tasks may also correspond to distinct locations within the system.

Figure 2:
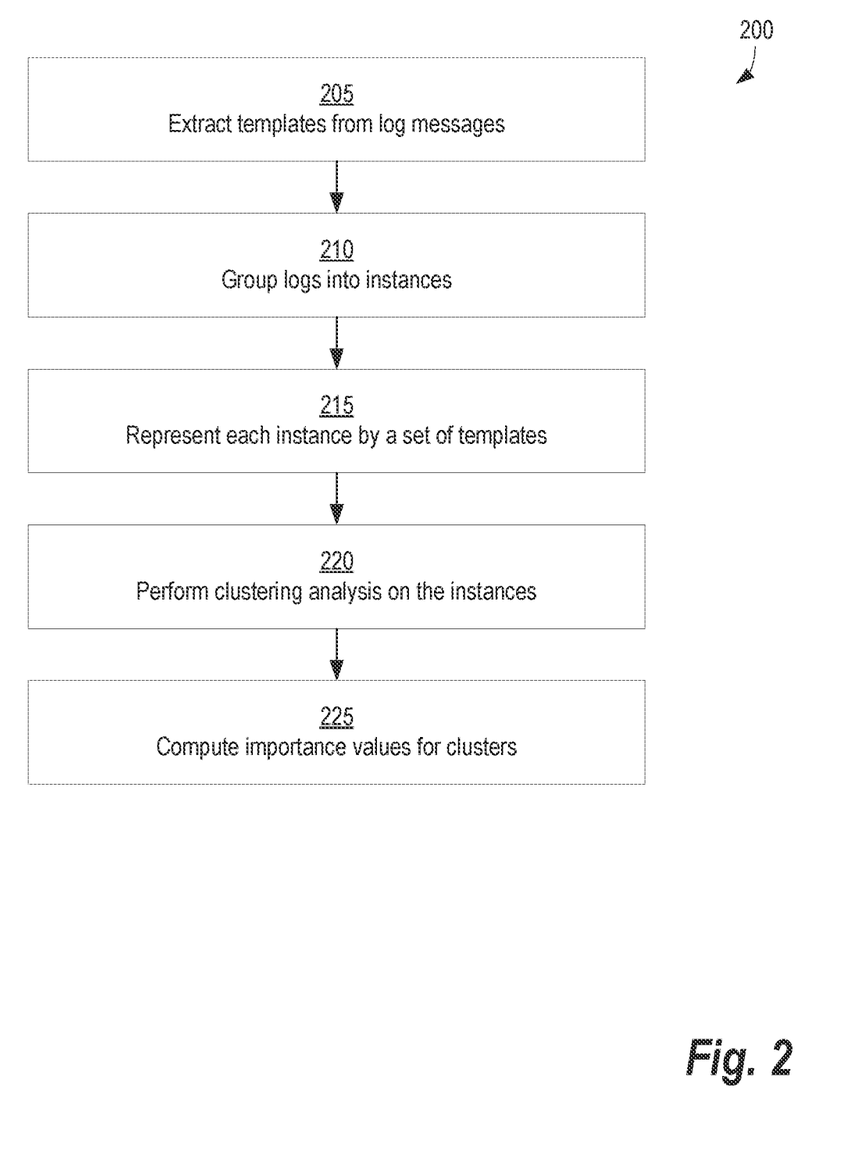
FIG. 2 illustrates a method for log analysis that may be applied in different embodiments of the present invention.

FIG. 2 illustrates a method 200 for log analysis that may be applied in different embodiments of the present invention. This method may be performed, for example, by the Log Processing Computer 125 or within one of the Components 105, 110, and 115 shown in FIG. 1.

Starting at step 205, templates are extracted from one or more log messages received from system components. As described above, each template comprises messages and parameters marking the starts and ends of instance. The extraction process can be driven based on a combination of sampling and domain knowledge. More specifically, log files from an extended period of time can be viewed by a domain expert, and the expert can then indicate how the log file is formatted. For example, in one embodiment, log files are collected over a period of weeks or months. Simple text processing may then be applied to identify unique lines in the log files. The line's uniqueness may be based on all of its characters or only a subset (e.g., the first n characters or last n characters, where n is a user-defined parameter). The domain expert can then indicate which characters are fixed or template part and which correspond to parameters. Template extraction methods generally known in the art may also be utilized at step 205.

Using the extracted templates, the logs are analyzed and grouped into instances at step 210. As noted above, these instances may be spatial, temporal, or task or job based. Thus, by analysis of parameters, a log entry can be designated as belonging to a particular instance. The correspondence between log entry and instance designation may be accomplished using various techniques. In one embodiment, a vector is generated for a set of log entries. The vector accounts for each log entry in the set. For example, a log entry may be parsed and mapped to a template id. A vector would then increment a counter corresponding to this template. In this way the vector can be thought of as a Bag of Templates. In some embodiments, further filtering or consolidation of log entries can be performed at step 210. For example, the count of each dimension can be transformed with a log or other function, or log entries could be grouped in ways other than by template mapping.

At step 215, each instance is represented by a set of templates of its messages. This results in a "bag-of-templates" representation similar to a "bag-of-words" representation used in text analysis. As is generally understood in the art, bag-of-words is a model that describes how often words occur within text such as a sentence or document. In typical implementations, text is translated into fixed-length vectors where each entry in a vector corresponds to a word in a pre-defined dictionary of words. The number stored in the field describes how often the word occurs within the text.

Figure 3:
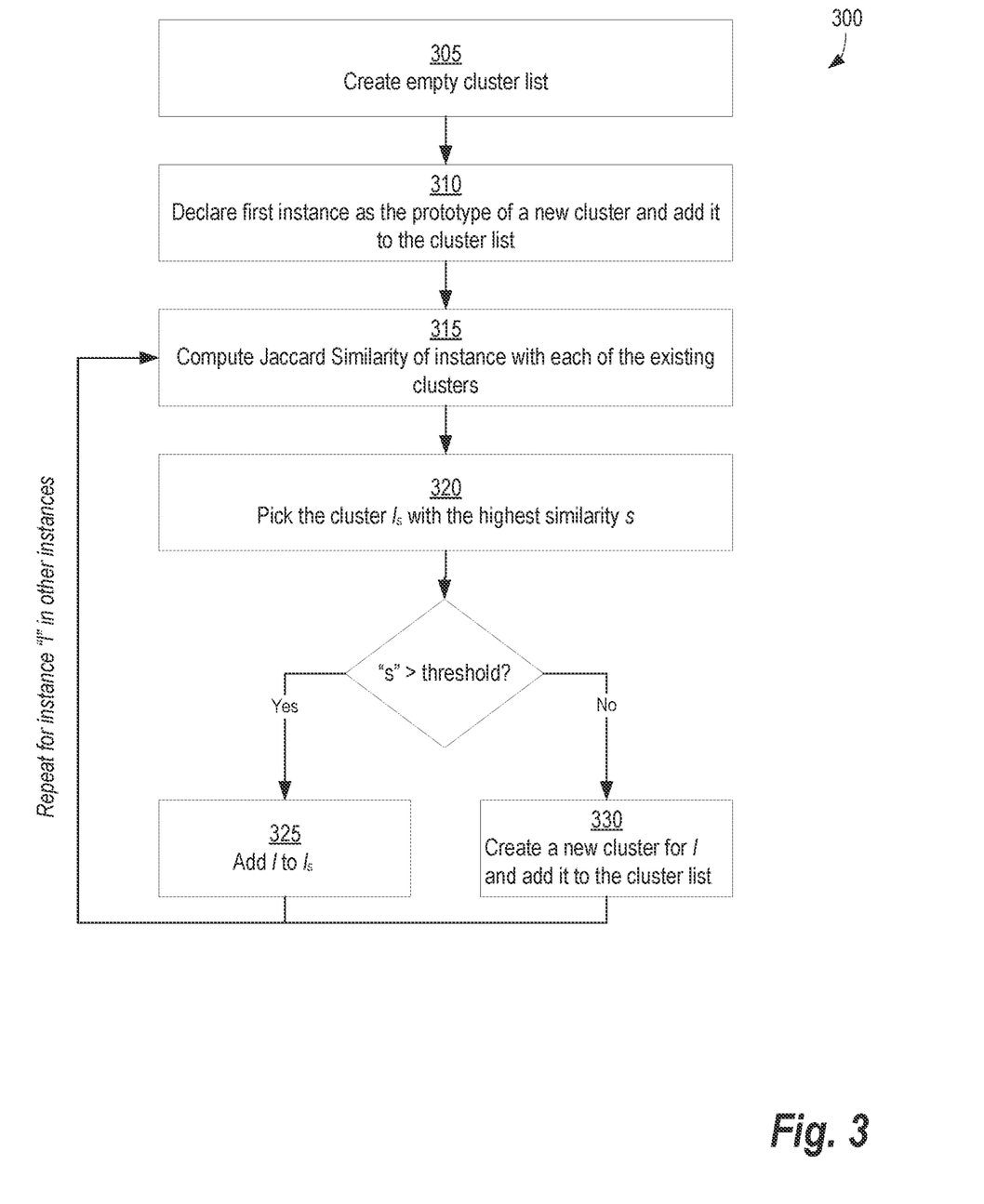
FIG. 3 illustrates an example method that performs one-pass clustering using Jaccard similarity.

One or more clustering analysis are performed on the instances at step 220. Various techniques may be used for clustering. These techniques may be implemented directly, or through standard toolkits such as scikit-learn. FIG. 3 illustrates an example method 300 that performs one-pass clustering using Jaccard similarity. As is generally understood in the art, Jaccard similarity of sets is the ratio of the size of the intersection of the sets to the size of the union. At step 305, an empty cluster list is created. Next, at step 310, the first instance is declared as the prototype of a new cluster and that instance is added to the cluster list. Then, steps 315-330 are performed for instance l in the other instances. Starting at step 315, the computing system calculates the Jaccard similarity of l with each of the existing clusters. At step 320, the cluster $l_s$ with the highest similarity s is selected. If the value of "s" is greater than a predetermined threshold value, l is added to cluster $l_s$ at step 324. If the value of s is less than or equal to the threshold, a new cluster is created for/and that cluster is added to the cluster list at step 330.

Returning to FIG. 2, cluster probability values, referred to herein as "importance values" are computed at step 225 for each template. More specifically, for any template k and cluster j, the probability of seeing that template in that cluster is computed, as well as the probability of that template being in any other cluster. The difference between these values is the importance of template k in cluster j. If this value is close to 0, the template is as common in the cluster as outside. If this value is high, then the template is much more common in the cluster than outside, and if it is low, then it is much more common outside. The importance measure allows clusters to be described in terms of templates, helping the end user to connect clustering results to their domain knowledge. Specifically, while bulk of the instances—and thus the largest clusters—will correspond to normal operations, some smaller clusters will consist of anomalous instances, and their "signature" in terms of templates will quickly point the user towards the symptom(s) or cause(s) of the anomaly.

In other embodiments, different methods of log analysis may be applied that are distinct from the method 200 shown in FIG. 2. For example, in some embodiments, outlier/anomaly detection methods may be applied to the representations from step 210, followed by use of explainable methods for interpreting the results.

Figure 4:
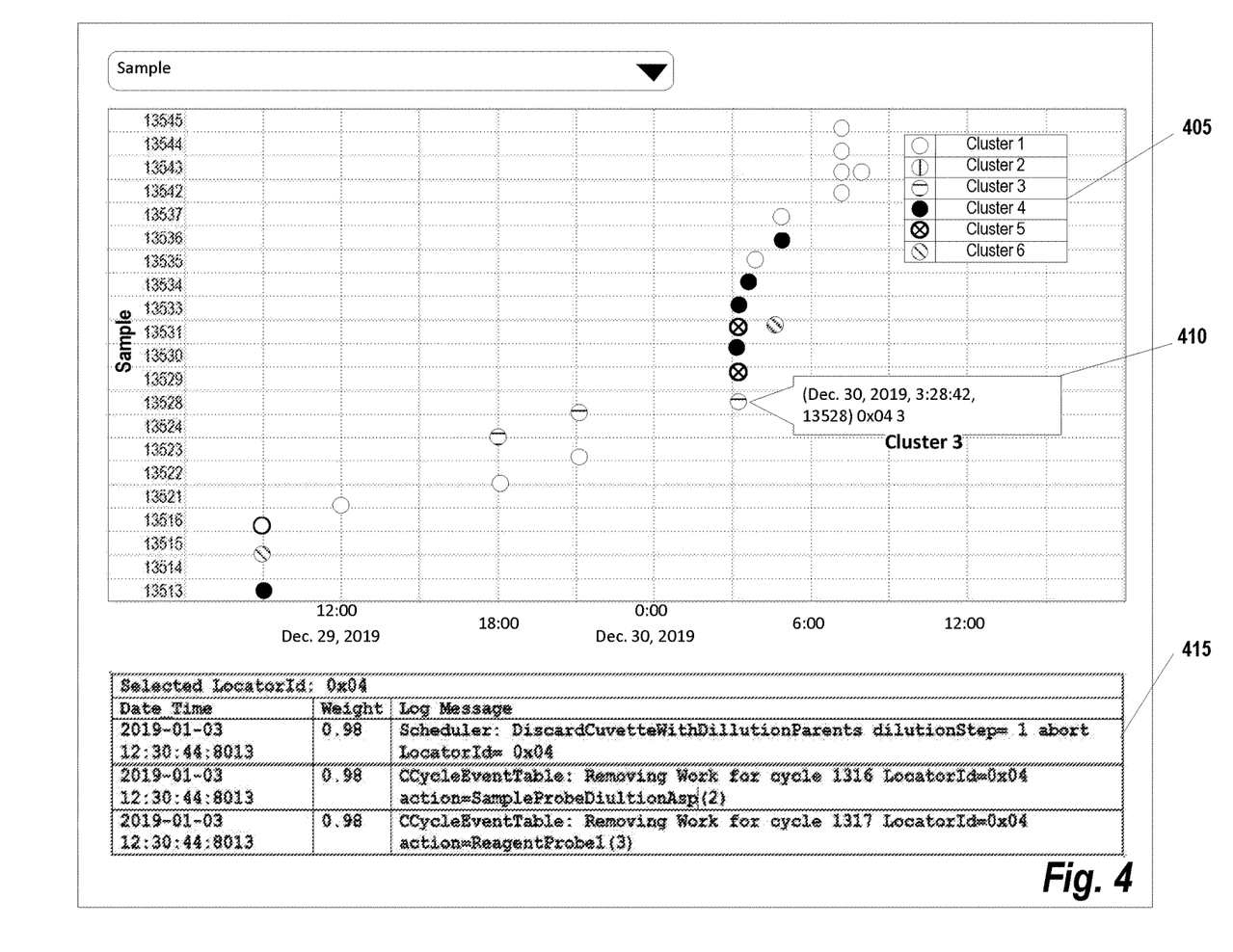
FIG. 4 shows an example graphical user interface (GUI) that may be used for the analysis discussed herein.
Figure 5:
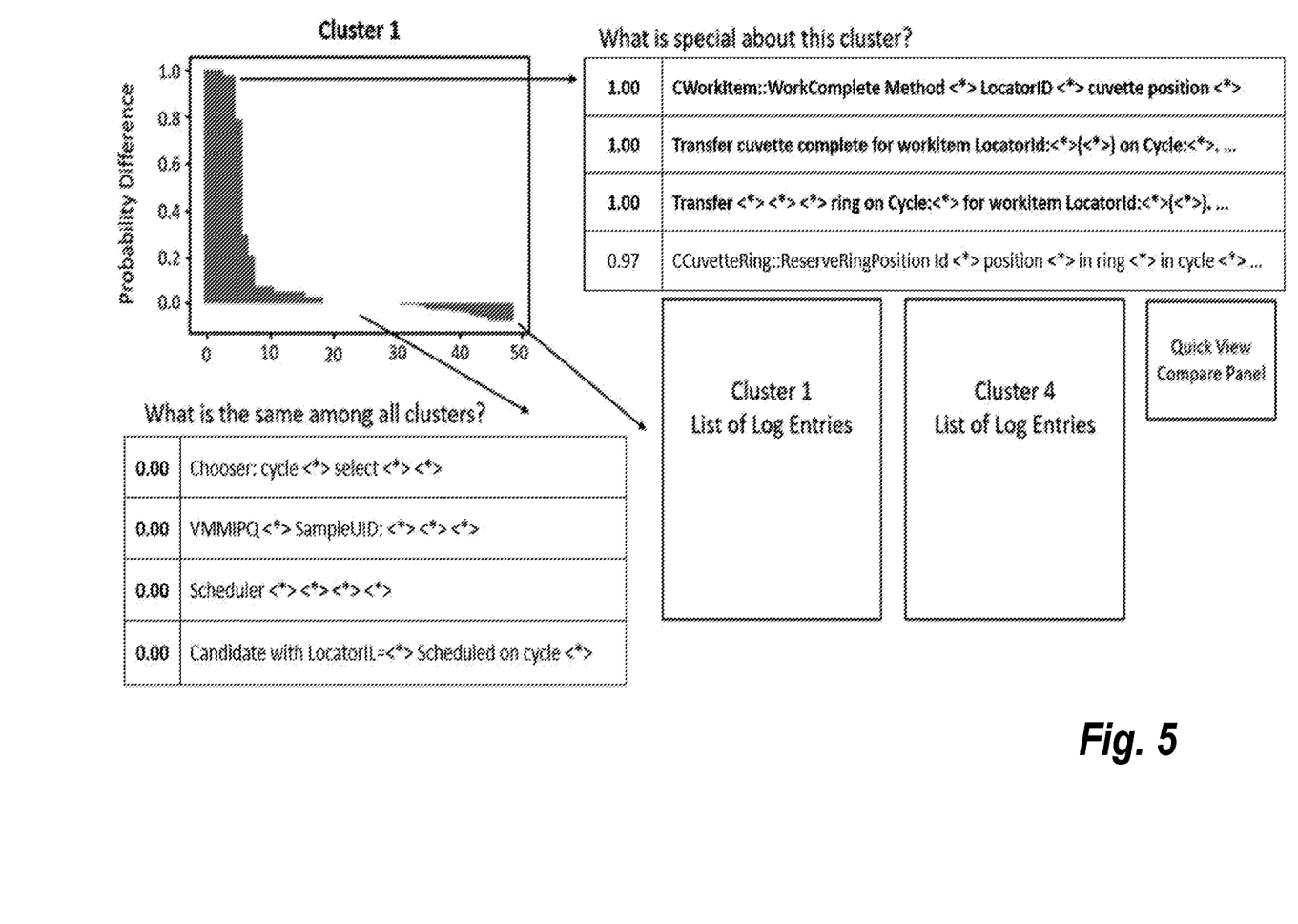
FIG. 5 shows sample feature importance plots that may be displayed in some embodiments.

In some embodiments, visual interfaces are used to assist a human user in understanding the clustering and importance values generated for log entries. FIG. 4 shows an example GUI that may be used for the analysis discussed herein. In this example, instances are shown with circular symbols on a plot, where x-axis indicates time of the instances, and y-axis indicates instance identifier. In this case, the log entries correspond to an Immunoassay and Clinical Chemistry Analyzer System (see FIG. 1) and the instance identifier is a sample identifier. As denoted in the Key 405, each symbol indicates which cluster a particular sample belongs to. Alternatively, the symbol can reflect, for example, the output of anomaly detection algorithm. The user can (de)activate certain clusters in order to focus of the selected instances. For example, in FIG. 4, the user has selected a particular instance designated as 0×04 and belonging to cluster 3 in the figure. A Graphical Element 410 is displayed providing additional detail on the instance. Additionally, a Bottom Display 415 provides additional information on each log entry in the instance including its date and time stamp, importance value (i.e., "weight") of the corresponding template, and the log message itself. Thus, this GUI enables the user to rapidly identify anomalous instances, when they first appeared. The user can also check what makes them different from other clusters by checking feature importance plots such as the one shown in FIG. 5.

Figure 6:
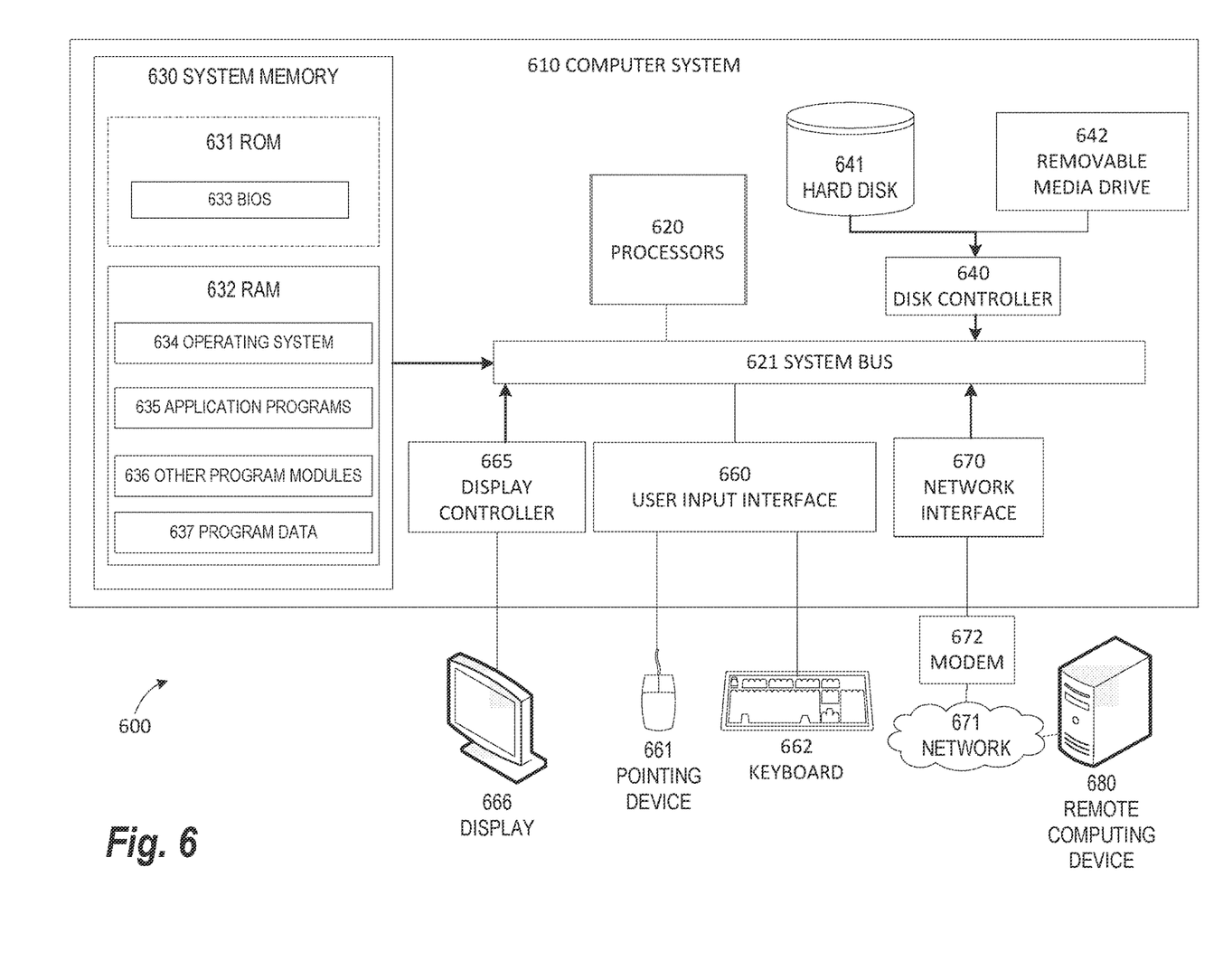
FIG. 6 illustrates an exemplary computing environment within which embodiments of the invention may be implemented.

FIG. 6 illustrates an exemplary computing environment 600 within which embodiments of the invention may be implemented. For example, in some embodiments, the computing environment 600 may be used for the Log Processing Computer 125 shown in FIG. 1. The computing environment 600 may include computer system 610, which is one example of a computing system upon which embodiments of the invention may be implemented. Computers and computing environments, such as computer system 610 and computing environment 600, are known to those of skill in the art and thus are described briefly here.

As shown in FIG. 6, the computer system 610 may include a communication mechanism such as a bus 621 or other communication mechanism for communicating information within the computer system 610. The computer system 610 further includes one or more processors 620 coupled with the bus 621 for processing the information. The processors 620 may include one or more central processing units (CPUs), graphical processing units (GPUs), or any other processor known in the art.

The computer system 610 also includes a system memory 630 coupled to the bus 621 for storing information and instructions to be executed by processors 620. The system memory 630 may include computer readable storage media in the form of volatile and/or nonvolatile memory, such as read only memory (ROM) 631 and/or random access memory (RAM) 632. The system memory RAM 632 may include other dynamic storage device(s) (e.g., dynamic RAM, static RAM, and synchronous DRAM). The system memory ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system (BIOS) 633 containing the basic routines that help to transfer information between elements within computer system 610, such as during start-up, may be stored in ROM 631. RAM 632 may contain data and/or program modules that are immediately accessible to and/or presently being operated on by the processors 620. System memory 630 may additionally include, for example, operating system 634, application programs 635, other program modules 636 and program data 637.

The computer system 610 also includes a disk controller 640 coupled to the bus 621 to control one or more storage devices for storing information and instructions, such as a hard disk 641 and a removable media drive 642 (e.g., floppy disk drive, compact disc drive, tape drive, and/or solid state drive). The storage devices may be added to the computer system 610 using an appropriate device interface (e.g., a small computer system interface (SCSI), integrated device electronics (IDE), Universal Serial Bus (USB), or FireWire).

The computer system 610 may also include a display controller 665 coupled to the bus 621 to control a display 666, such as a cathode ray tube (CRT) or liquid crystal display (LCD), for displaying information to a computer user. The computer system includes an input interface 660 and one or more input devices, such as a keyboard 662 and a pointing device 661, for interacting with a computer user and providing information to the processor 620. The pointing device 661, for example, may be a mouse, a trackball, or a pointing stick for communicating direction information and command selections to the processor 620 and for controlling cursor movement on the display 666. The display 666 may provide a touch screen interface which allows input to supplement or replace the communication of direction information and command selections by the pointing device 661.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium, such as a hard disk 641 or a removable media drive 642. The hard disk 641 may contain one or more datastores and data files used by embodiments of the present invention. Datastore contents and data files may be encrypted to improve security. The processors 620 may also be employed in a multi-processing arrangement to execute the one or more sequences of instructions contained in system memory 630. In alternative embodiments, hardwired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any medium that participates in providing instructions to the processor 620 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 641 or removable media drive 642. Non-limiting examples of volatile media include dynamic memory, such as system memory 630. Non-limiting examples of transmission media include coaxial cables, copper wire, and fiber optics, including the wires that make up the bus 621. Transmission media may also take the form of acoustic or light waves, such as those generated during radio wave and infrared data communications.

The computing environment 600 may further include the computer system 610 operating in a networked environment using logical connections to one or more remote computers, such as remote computer 680. Remote computer 680 may be a personal computer (laptop or desktop), a mobile device, a server, a router, a network PC, a peer device or other common network node, and typically includes many or all of the elements described above relative to computer system 610. When used in a networking environment, computer system 610 may include modem 672 for establishing communications over a network 671, such as the Internet. Modem 672 may be connected to bus 621 via user network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computer 680). The network 671 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The term "graphical user interface" (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f), unless the element is expressly recited using the phrase "means for."

We claim:

1. A computer-implemented method for analyzing log files generated by complex physical equipment, the method comprising:
    receiving one or more log files generated by one or more components of physical equipment, wherein each log file comprises one or more log entries;
    extracting a plurality of templates from each log file describing fixed portions of the log entries;
    grouping the log entries into a plurality of instances, within a plurality of dimensions, the dimensions including at least a time dimension, a spatial dimension describing where in the physical equipment log entries were generated, and a task dimension, wherein log entries share an instance with others in each dimension if they share an attribute in that dimension;
    creating a representation of each instance describing a set of the templates included in the instance;
    generating a plurality of clusters by applying a clustering process to the representations of the instances, the representation including at least a count of each template in each instance; and
    creating a visual depiction of the clusters and the instances in a graphical user interface (GUI), wherein the GUI displays the plurality of instances grouped in one of the plurality of dimensions and an indication of which of the plurality of clusters each instance belongs to, provides details on which templates are most important to instances in each cluster, and allows a user to select an individual instance for additional information.

2. The method of claim 1, wherein the visual depiction of the clusters and the instances is a plot of the clusters and the plot has an x-axis listing the instances.

3. The method of claim 2, wherein the plot has an y-axis listing time values.

4. The method of claim 1, further comprising:
    for each combination of template and cluster, computing an importance value describing how common the template is within the cluster; and
    displaying the importance value for the cluster when the cluster is selected by a user in the GUI.

5. The method of claim 4, wherein the importance value for a template and cluster is the difference between a first probability of the template being in the cluster and a second probability of the template being in one or more other templates in the plurality of templates extracted from the log files.

6. The method of claim 1, further comprising:
    upon selection of one of the clusters in the graphical user interface, displaying one or more of the log entries corresponding to the cluster.

7. The method of claim 1, wherein the time dimension describes execution cycles of the physical equipment associated with generation of the log entries.

8. The method of claim 1, wherein the physical equipment dimension describes a location within the physical equipment associated with generation of the log entries.

9. The method of claim 1, wherein the plurality of dimensions further comprises a job dimension describing a job associated with generation of the log entries.

10. The method of claim 1, wherein the machine task dimension describes a physical task associated with generation of the log entries.

11. The method of claim 1, wherein representation of each instance is a vector comprising an element for each of the templates and each element of the vector stores a count of templates of a particular type or a function of the count.

12. The method of claim 1, wherein the clustering process comprises:
    creating a cluster list;
    declaring a first instance of the plurality of instances as a prototype of a first cluster;
    adding the first cluster to the cluster list;
    for each additional instance in the plurality of instances,
        computing a similarity measurement of the additional instance to clusters in the cluster list,
        identifying a particular cluster in the cluster list having a highest value for the similarity measurement,
        if the highest value is greater than a pre-determined threshold, adding the additional instance to the particular cluster, and if the highest value is not greater than the pre-determined threshold, creating a new cluster in the cluster list and adding the additional instance to the new cluster.

13. The method of claim 12, wherein the similarity measurement is Jaccard similarity.

14. The method of claim 1, wherein the one or more components of physical equipment are part of a immunoassay and clinical chemistry analyzer system and each instance corresponds to a test sample.

15. An article of manufacture for analyzing log files generated by complex physical equipment, the article of manufacture comprising a non-transitory, tangible computer-readable medium holding computer-executable instructions for performing a method comprising:

receiving one or more log files generated by one or more components of physical equipment, wherein each log file comprises one or more log entries;

extracting a plurality of templates from each log file describing fixed portions of the log entries;

grouping the log entries into a plurality of instances, within a plurality of dimensions, the dimensions including at least a time dimension, a spatial dimension describing where in the physical equipment log entries were generated, and a machine task dimension, wherein log entries share an instance with others in each dimension if they share an attribute in that dimension;

creating a representation of each instance describing a set of the templates included in the instance;

generating a plurality of clusters by applying a clustering process to the representations of the instances, the representation including at least a count of each template in each instance; and creating a visual depiction of the clusters and the instances in a GUI), wherein the GUI displays the plurality of instances grouped in one of the plurality of dimensions and an indication of which of the plurality of clusters each instance belongs to, provides details on which templates are most important to instances in each cluster, and allows a user to select an individual instance for additional information.

16. The article of manufacture of claim 15, wherein the visual depiction of the clusters and the instances is a plot of the clusters and the plot has an x-axis listing the instances.

17. The article of manufacture of claim 15, wherein the method further comprises:

for each combination of template and cluster, computing an importance value describing how common the template is within the cluster; and displaying the importance value for the cluster when the cluster is selected by a user in the GUI.

18. The article of manufacture of claim 17, wherein the importance value for a template and cluster is the difference between a first probability of the template being in the cluster and a second probability of the template being in one or more other templates in the plurality of templates extracted from the log files.

19. The article of manufacture of claim 15, wherein the method further comprises:

upon selection of one of the clusters in the graphical user interface, displaying one or more of the log entries corresponding to the cluster.

20. A system for analyzing log files generated by complex physical equipment, the system comprising:

a non-transitory, tangible computer-readable medium holding one or more log files generated by one or more components of physical equipment, wherein each log file comprises one or more log entries;

one or more processors configured to:

extract a plurality of templates from each log file describing fixed portions of the log entries;

group the log entries into a plurality of instances, within a plurality of dimensions, the dimensions including at least a time dimension, a spatial dimension describing where in the physical equipment log entries were generated, and a machine task dimension, wherein log entries share an instance with others in each dimension if they share an attribute in that dimension;

create a representation of each instance describing a set of the templates included in the instance;

generate a plurality of clusters by applying a clustering process to the representations of the instances; and a display presenting a visual depiction of the clusters and the instances in a GUI), wherein the GUI displays the plurality of instances grouped in one of the plurality of dimensions and an indication of which of the plurality of clusters each instance belongs to, provides details on which templates are most important to instances in each cluster, and allows a user to select an individual instance for additional information.

* * * * *